United States Patent
Noda et al.

(10) Patent No.: US 8,768,330 B2
(45) Date of Patent: Jul. 1, 2014

(54) COMMUNICATION TERMINAL APPARATUS, COMPUTER PRODUCT, AND INCOMING CALL PROCESSING METHOD

(71) Applicant: Fujitsu Limited, Kawasaki (JP)

(72) Inventors: Masahide Noda, Kawasaki (JP); Naoki Nishiguchi, Kawasaki (JP); Masatomo Yasaki, Kako (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/759,571

(22) Filed: Feb. 5, 2013

(65) Prior Publication Data

US 2013/0143544 A1 Jun. 6, 2013

Related U.S. Application Data

(63) Continuation of application No. PCT/JP2010/063942, filed on Aug. 18, 2010.

(51) Int. Cl.
H04M 3/00 (2006.01)

(52) U.S. Cl.
USPC .............. 455/418; 455/552.1; 455/414.1

(58) Field of Classification Search
CPC ....... H04W 4/001; H04W 4/00; H04W 88/06; H04W 4/16; H04W 4/003; H04W 4/02; H04W 4/005; H04W 4/18
USPC .............. 455/414.1–418, 552.1, 553.1, 455/456.1–457, 426.1, 419; 719/311–319; 711/103
See application file for complete search history.

(56) References Cited

U.S. PATENT DOCUMENTS

| | | | |
|---|---|---|---|
| 6,012,113 A * | 1/2000 | Tuckner | 710/64 |
| 2002/0087694 A1 | 7/2002 | Daoud et al. | |
| 2004/0171373 A1 | 9/2004 | Suda et al. | |
| 2008/0056472 A1 * | 3/2008 | Tanemura et al. | 379/201.01 |
| 2008/0153421 A1 * | 6/2008 | Rothman et al. | 455/63.3 |
| 2009/0036111 A1 * | 2/2009 | Danford et al. | 455/419 |
| 2010/0064154 A1 * | 3/2010 | King | 713/320 |
| 2010/0097386 A1 * | 4/2010 | Kim et al. | 345/545 |
| 2010/0124192 A1 * | 5/2010 | Prasad et al. | 370/328 |
| 2011/0070873 A1 * | 3/2011 | Balasaygun et al. | 455/418 |
| 2011/0314467 A1 * | 12/2011 | Pearson | 718/1 |

FOREIGN PATENT DOCUMENTS

| | | |
|---|---|---|
| EP | 0 473 913 A2 | 3/1992 |
| JP | 5-88922 | 4/1993 |
| JP | 08-087473 | 4/1996 |
| JP | 09-212467 | 8/1997 |
| JP | 2002-245017 | 8/2002 |

(Continued)

OTHER PUBLICATIONS

International Search Report of Corresponding PCT Application PCT/JP2010/063942 mailed Oct. 26, 2010.

(Continued)

Primary Examiner — Daniel Lai
(74) Attorney, Agent, or Firm — Staas & Halsey LLP

(57) ABSTRACT

A communication terminal apparatus includes a computer configured to receive an incoming call request from a caller device; identify a communication service requested by the caller device, based on the received incoming call request; retrieve from among a plurality of OSs running on the communication terminal apparatus and based on communication services processable by each OS included among the OSs, an OS capable of processing the identified communication service; and allocate the incoming call request to the retrieved OS.

10 Claims, 14 Drawing Sheets

(56) References Cited

FOREIGN PATENT DOCUMENTS

| JP | 2004-005669 | 1/2004 |
|---|---|---|
| JP | 2004-242274 | 8/2004 |
| JP | 2006-072958 | 3/2006 |

OTHER PUBLICATIONS

Japanese Patent Office Notice of Rejection mailed Jun. 18, 2013 for corresponding Japanese Patent Application No. 2012-529437.

* cited by examiner

OS CORRELATION TABLE 200

| SERVICE ID | OS NAME |
|---|---|
| S1 | OS1 |
| S2 | OS2 |
| S3 | OS3 |
| ⋮ | ⋮ |
| Sm | ... |

START
↓
S301: HAS INCOMING CALL REQUEST BEEN RECEIVED? — NO (loop)
↓ YES
S302: IDENTIFY SERVICE ID OF COMMUNICATION SERVICE Sj REQUESTED BY CALLER DEVICE
↓
S303: RETRIEVE FROM OS CORRELATION TABLE, OSi CORRESPONDING TO SERVICE ID OF COMMUNICATION SERVICE Sj
↓
S304: ALLOCATE INCOMING CALL REQUEST TO OSi
↓
END

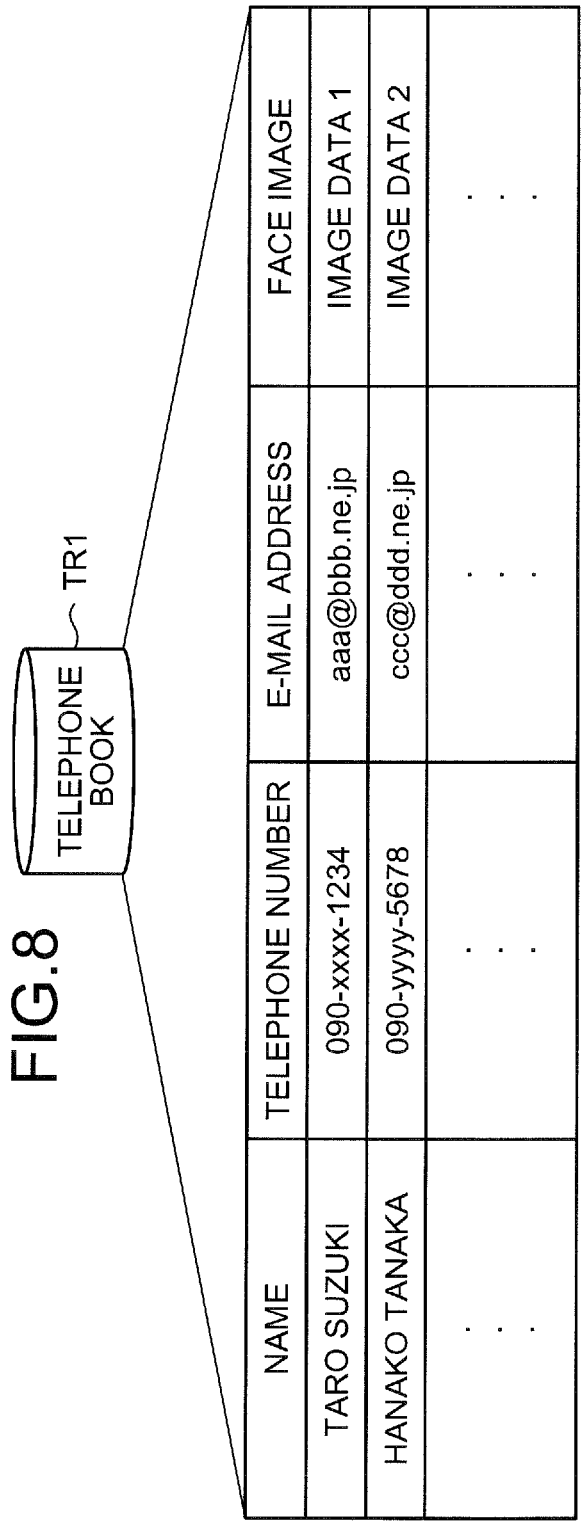

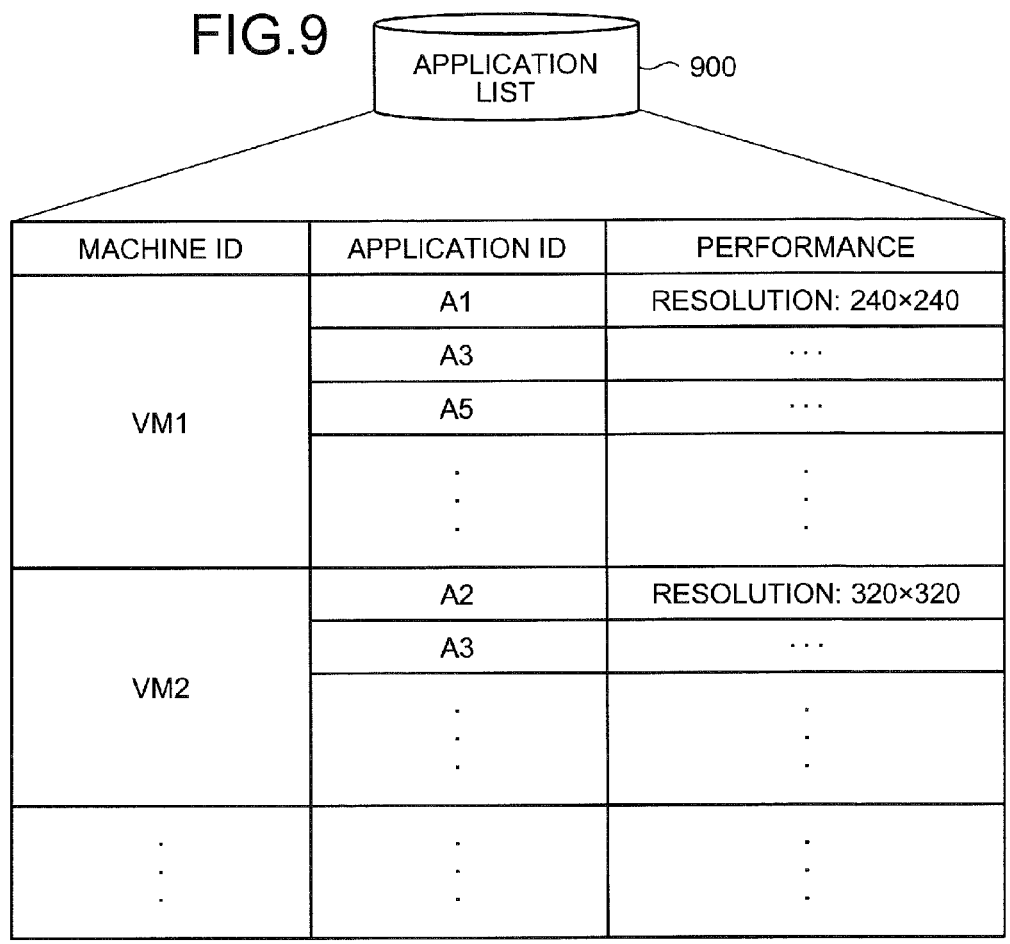
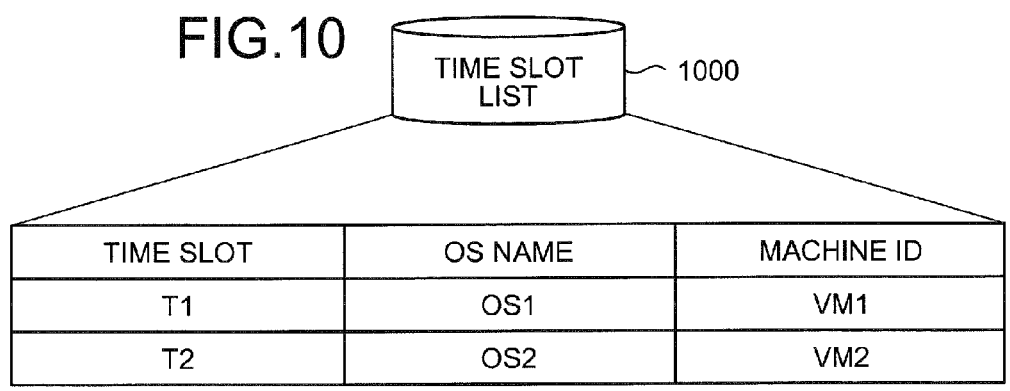

| LOCATION | POSITIONAL INFORMATION | OS NAME | MACHINE ID |
|---|---|---|---|
| L1 | ... | OS1 | VM1 |
| L2 | ... | OS2 | VM2 |

FIG.12

OPERATION HISTORY TABLE ~1200

| SERVICE ID | OS NAME | | | | |
| --- | --- | --- | --- | --- | --- |
| | OS1 | OS2 | OS3 | OS4 | OS5 |
| S1 | ⋮ | ⋮ | ⋮ | ⋮ | ⋮ |
| S2 | ⋮ | ⋮ | ⋮ | ⋮ | ⋮ |
| ⋯ | ⋯ | ⋯ | ⋯ | ⋯ | ⋯ |
| S7 | 0 | 2 | 5 | 12 | 0 |
| ⋯ | ⋯ | ⋯ | ⋯ | ⋯ | ⋯ |
| Sm | ⋮ | ⋮ | ⋮ | ⋮ | ⋮ |

COMMUNICATION TERMINAL APPARATUS, COMPUTER PRODUCT, AND INCOMING CALL PROCESSING METHOD

CROSS REFERENCE TO RELATED APPLICATIONS

This application is a continuation application of International Application PCT/JP2010/063942, filed on Aug. 18, 2010 and designating the U.S., the entire contents of which are incorporated herein by reference.

FIELD

The embodiments discussed herein are related to a communication terminal apparatus and incoming call processing.

BACKGROUND

Virtualization technology causing multiple operating systems (OSs) to run on a single computer is expected to be applied to a communication terminal such as a mobile telephone. If multiple OSs run on a single mobile telephone, a user previously carrying multiple mobile telephones can integrate the functions of the mobile telephones into one mobile telephone.

Related prior arts include a mobile terminal including a mobile machine OS, an application manager controlling a contactless integrated circuit (IC), and a device driver of the contactless IC. The mobile machine OS executes various functions of the mobile terminal. The device driver drives the OS of the contactless IC under the control of the application manager.

Further, a communication system exists that includes a tag that transmits ID information of the device to which the tag belongs, a server capable of connecting to a cellular communication network, and an aggregation point that aggregates information from the tag. In the communication system, the aggregation point includes a receiving unit that receives ID information from the tag and a communicating unit that performs cellular communication via the cellular communication network. The aggregation point receives from the server, a switching signal for switching between multiple modes including a cellular communication mode and a tag receiving function to provide mode switching control.

Refer to Japanese Laid-Open Patent Publication Nos. 2006-72956 and 2004-242274 for examples of related arts.

However, in the conventional technologies described above, if multiple OSs running on a terminal respectively have different features, a problem arises in that it is difficult to determine which OS should be used at the time of an incoming call. As a result, for example, if the caller makes a video phone call and an OS that does not support video phone calls is used on the receiving side, the video phone call cannot be complete and communication is hindered.

SUMMARY

According to an aspect of an embodiment, a communication terminal apparatus includes a computer configured to receive an incoming call request from a caller device; identify a communication service requested by the caller device, based on the received incoming call request; retrieve from among a plurality of OSs running on the communication terminal apparatus and based on communication services processable by each OS included among the OSs, an OS capable of processing the identified communication service; and allocate the incoming call request to the retrieved OS.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 is an explanatory view of an example of the contents of the telephone book;

FIG. 9 is an explanatory view of an example of the contents of an application list;

FIG. 10 is an explanatory view of an example of the contents of a time slot list;

FIG. 12 is an explanatory view of an example of the contents of an operation history table;

DESCRIPTION OF EMBODIMENTS

Preferred embodiments of a communication terminal apparatus, an incoming call processing program, and an incoming call processing method according to the present invention will be described in detail with reference to the accompanying drawings.

A functional configuration of a communication terminal apparatus 100 according to a first embodiment will be described. The communication terminal apparatus 100 is a computer having a communication function and is, for example, a mobile telephone, a personal handy-phone system (PHS) telephone, or a smartphone.

Figure 1:
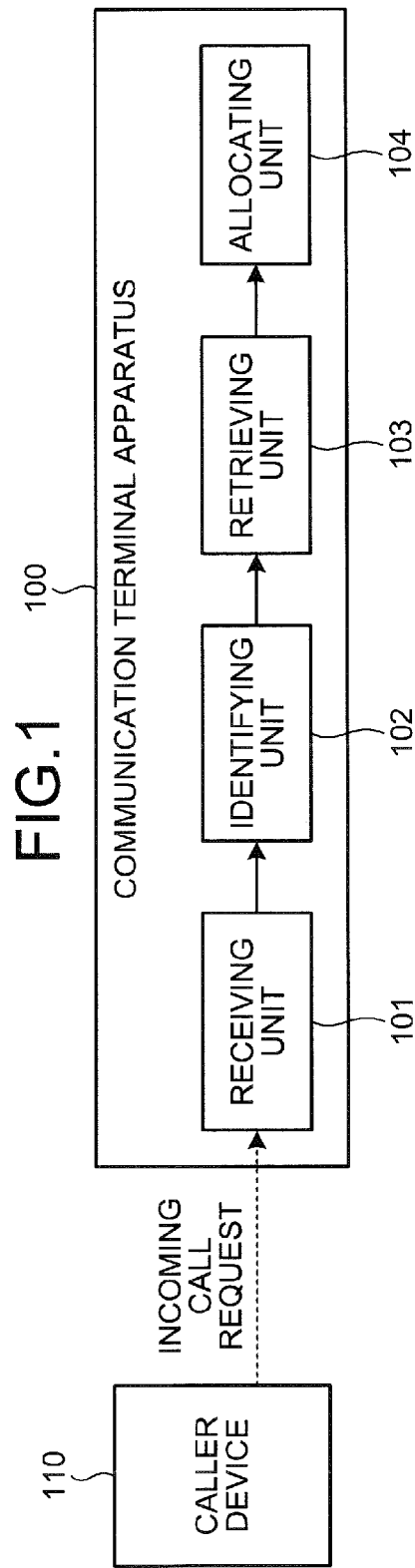
FIG. 1 is a block diagram of an example of a functional configuration of a communication terminal apparatus according to a first embodiment.

FIG. 1 is a block diagram of an example of a functional configuration of the communication terminal apparatus 100 according to the first embodiment. In FIG. 1 the communication terminal apparatus 100 includes a receiving unit 101, an identifying unit 102, a retrieving unit 103, and allocating unit 104.

The receiving unit 101 receives an incoming call request from a caller device 110. The caller device 110 is, for example, a communication terminal apparatus capable of communicating with the communication terminal apparatus 100, via a telephone network provided by a telecommunications carrier. The incoming call request is an incoming call request for telephone or e-mail. The incoming call request includes an identifier of the caller device 110 and an identifier of a communication service requested by the caller device 110, for example.

The identifying unit 102 identifies the communication service requested by the caller device 110, based on the received incoming call request. A communication service is a service provided by a telecommunications carrier to users. The communication service may be, for example, a service enabling one to make a phone call while viewing the face of the other person, a service enabling a phone call among three or more persons, and a service of displaying a message such as characters and pictograms on an incoming call screen of the other party at the same time as the incoming call.

For example, the identifying unit 102 identifies an identifier of a communication service requested by the caller device 110 included in the received incoming call request. In the following description, multiple communication services provided by a telecommunications carrier to users will be referred to as "communication services S1 to Sm". An arbitrary communication service of the communication services S1 to Sm will be referred to as a "communication service Sj" (j=1, 2, ..., m).

The retrieving unit 103 retrieves an OS capable of processing the identified communication service requested by the caller device 110 among multiple OSs, based on communication services processable by each OS included among the multiple OSs running on the terminal. Each OS is software that processes incoming call requests from the caller device 110. Each OS has processable communication services and unprocessable communication services, among the communication services 51 to Sm. In the following description, the multiple OSs running on the communication terminal apparatus 100 will be referred to as "OS1 to OSn". An arbitrary OS among the OS1 to OSn will be referred to as an "OSi" (i=1, 2, ..., n).

Figures 2, 3:
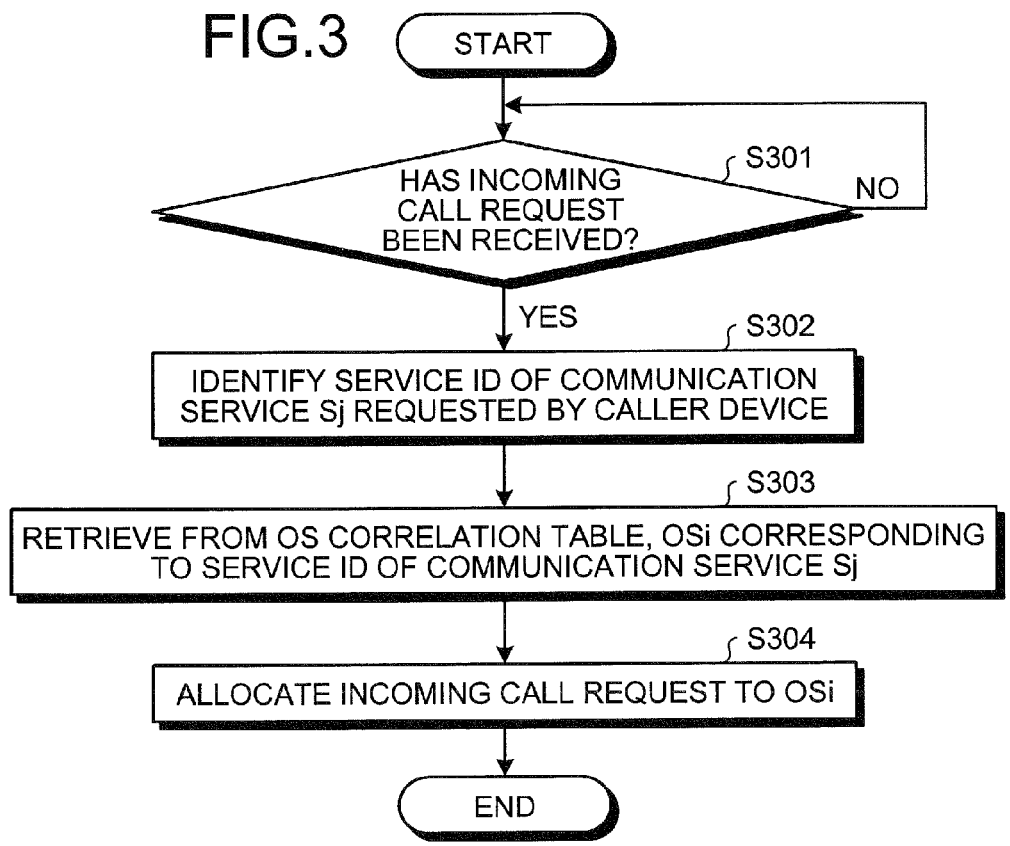
FIG. 2 is an explanatory view of an example of the contents of an OS correlation table.
FIG. 3 is a flowchart of an example of an incoming call process procedure of the communication terminal apparatus according to the first embodiment.

For example, the retrieving unit 103 retrieves the OSi corresponding to the identifier of the communication service Sj requested by the caller device 110, from an OS correlation table 200 depicted in FIG. 2. The OS correlation table 200 is a table indicating the communication services processable by each OS included among the OSs running on the terminal. The contents of the OS correlation table 200 will be described.

FIG. 2 is an explanatory view of an example of the contents of an OS correlation table. In FIG. 2, the OS correlation table 200 stores for each OSi included among the multiple OSs from OS1 to OSn, a service ID of each communication service Sj processable by the OSi. The service ID is an identifier of the communication service Sj provided by the telecommunications carrier to users. An OS name is the name of the OSi running on the communication terminal apparatus 100.

The service Sj processable by the OSi running on the terminal can be identified with the OS correlation table 200. For example, if a service ID "S1" is identified as the identifier of the communication service Sj requested by the caller device 110, the retrieving unit 103 refers to the OS correlation table 200 to retrieve the OS name "OS1" corresponding to the identified service ID "S1".

The allocating unit 104 allocates an incoming call request from the caller device 110 to a retrieved OSi. For example, the allocating unit 104 delivers an incoming call request from the caller device 110 to a functional unit of the retrieved OSi processing the incoming call request. As a result, the OSi processes the incoming call request from the caller device 110 and provides the communication service Sj requested by the caller device 110.

FIG. 3 is a flowchart of an example of an incoming call process procedure of the communication terminal apparatus according to the first embodiment. In the flowchart of FIG. 3, the communication terminal apparatus determines whether the receiving unit 101 has received an incoming call request from the caller device 110 (step S301).

The communication terminal apparatus waits until the receiving unit 101 receives an incoming call request from the caller device 110 (step S301: NO). When the receiving unit 101 receives an incoming call request (step S301: YES), the identifying unit 102 identifies the service ID of the communication service Sj requested by the caller device 110 and included in the received incoming call request (step S302).

The retrieving unit 103 retrieves the OSi corresponding to the service ID of the communication service Sj requested by the caller device 110, from the OS correlation table 200 depicted in FIG. 2 (step S303). The allocating unit 104 allocates the incoming call request from the caller device 110 to the retrieved OSi (step S304) and a series of the processes of this flowchart is terminated.

The communication terminal apparatus 100 according to the first embodiment described above can retrieve from among the multiple OSs from OS1 to OSn running on the terminal, the OSi capable of processing the communication service Sj requested by the caller device 110 to allocate the incoming call request from the caller device 110. As a result, the incoming call request from the caller device 110 can be processed properly and the communication service Sj reflecting the intention of the caller device 110 can be provided to a user.

One example of a communication terminal apparatus 400 according to a second embodiment will be described. Components identical to those described in the first embodiment are denoted by the same reference numerals used in the first embodiment and will not be described. A hardware configuration of the communication terminal apparatus 400 according to the second embodiment will be described.

Figure 4:
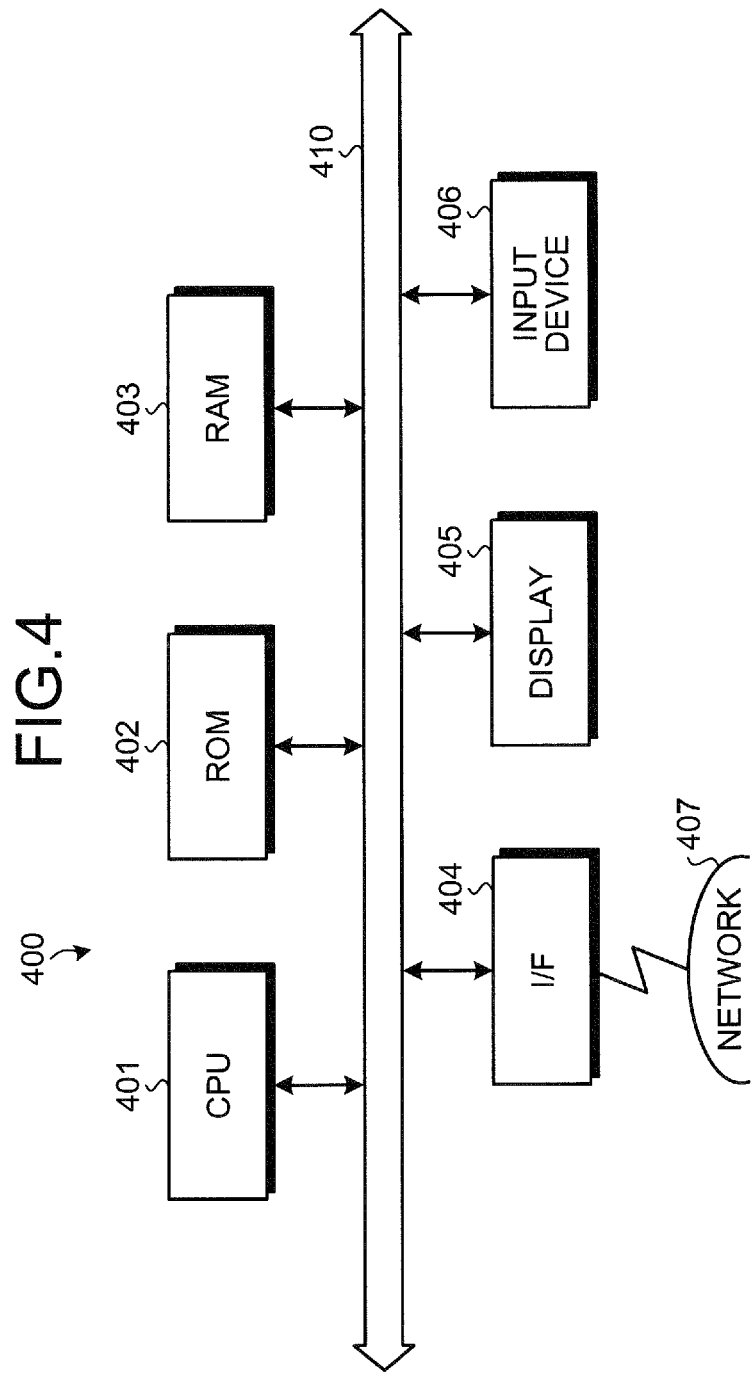
FIG. 4 is a block diagram of a hardware configuration of the communication terminal apparatus.

FIG. 4 is a block diagram of a hardware configuration of the communication terminal apparatus. As depicted in FIG. 4, the communication terminal apparatus includes a central processing unit (CPU) 401, a read-only memory (ROM) 402, a random access memory (RAM) 403, an interface (I/F) 404, a display 405, and an input device 406, respectively connected by a bus 410.

The CPU 401 governs overall control of the communication terminal apparatus. The CPU 401 may be single core processor or a multi-core processor. The ROM 402 stores therein programs such as a boot program. The RAM 403 is used as a work area of the CPU 401. The I/F 404 is connected to a wired or wireless network 407 and is connected to other apparatuses through the network 407. The I/F 404 administers an internal interface with the network 407 and controls the input/output of data from/to external apparatuses.

The display 405 displays, for example, data such as text, images, functional information, etc., in addition to a cursor, icons, and/or tool boxes. A liquid crystal display may be employed as the display 405. The input device includes, for example, keys for inputting letters, numerals, and various instructions and performs the input of data. Alternatively, a touch-panel-type input pad or numeric keypad, etc. may be adopted.

Figure 5:
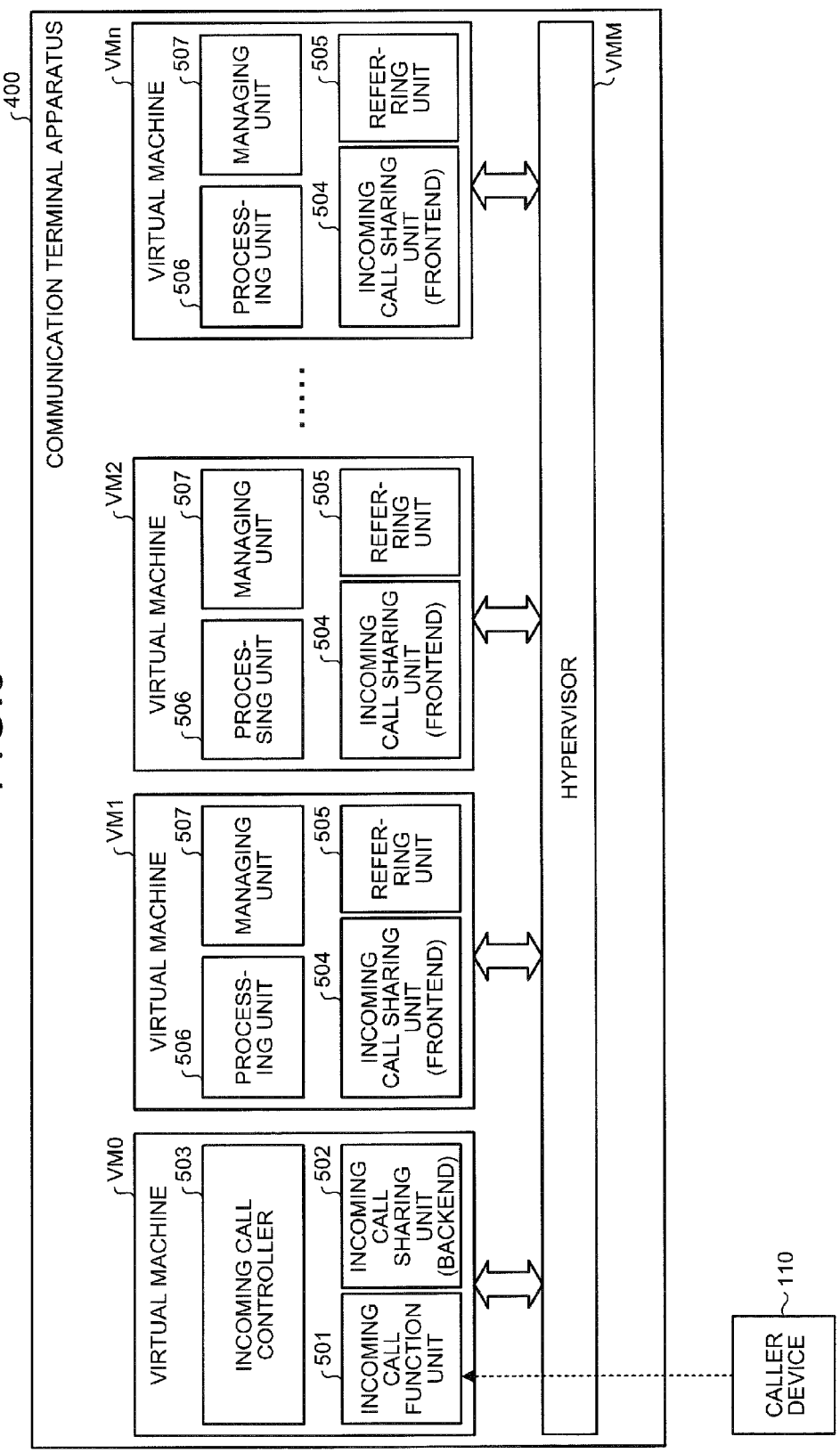
FIG. 5 is an explanatory view of one example of the communication terminal apparatus according to a second embodiment.

FIG. 5 is an explanatory view of one example of the communication terminal apparatus according to the second embodiment. In FIG. 5, the communication terminal apparatus 400 includes virtual machines VM0 to VMn and a hypervisor VMM.

The virtual machines VM0 to VMn are virtual computers running on the communication terminal apparatus 400. For example, the virtual machines VM0 to VMn are software running in execution environments established by dividing the hardware resources (such as the CPU 401, the ROM 402, the RAM 403, the I/F 404) of the communication terminal apparatus 400.

The entities of the virtual machines VM0 to VMn include, for example, software such as programs and OSs, variables given to the software, and information specifying hardware resources for executing the software. The virtual machines VM1 to VMn respectively execute the different OS1 to OSn.

The hypervisor VMM virtualizes and controls computers such that the different OSs from OS1 to OSn can be executed. For example, the hypervisor VMM activates the different OSs from OS1 to OSn on the virtual machines VM1 to VMn.

The virtual machine VM0 includes an incoming call function unit 501, an incoming call sharing unit (backend) 502, and an incoming call controller 503. The incoming call function unit 501 receives an incoming call request from the caller device 110. The incoming call function unit 501 is the I/F 404 depicted in FIG. 4, for example. The incoming call sharing unit (backend) 502 is a function for sharing the incoming call function unit 501 among the multiple OSs from OS1 to OSn. The incoming call controller 503 determines a virtual machine to process an incoming call request from the caller device 110.

Each of the virtual machines VM1 to VMn includes an incoming call sharing unit (frontend) 504, a referring unit 505, a processing unit 506, and a managing unit 507. The incoming call sharing unit (frontend) 504 is a function for sharing the incoming call function unit 501 of the virtual machine VM0 among the multiple OSs from OS1 to OSn. The referring unit 505 notifies the incoming call controller 503 of the information of the virtual machines VM1 to VMn in response to a request from the incoming call controller 503 of the virtual machine VM0. The processing unit 506 processes an incoming call request from the caller device 110. The managing unit 507 manages the service Sj processable by each of the OS1 to OSn running on the virtual machines VM1 to VMn.

In the communication terminal apparatus 400, the incoming call function unit 501 of the virtual machine VM0 is shared by the different OSs, OS1 to OSn. For example, the communication terminal apparatus 400 has the incoming call sharing unit (backend) 502 driving the I/F 404 and has the incoming call sharing unit (frontend) 504 for sharing the I/F 404 among the multiple OSs, OS1 to OSn.

Communication between the virtual machines in the communication terminal apparatus 400 is performed via the hypervisor VMM. For example, communication between the incoming call sharing unit (backend) 502 of the virtual machine VM0 and the incoming call sharing unit (frontend) 504 of each of the virtual machines VM1 to VMn is performed via the hypervisor VMM.

An example of a process procedure of the communication terminal apparatus 400 at the time of an incoming call will be described. In the communication terminal apparatus 400, the incoming call function unit 501 receives an incoming call request from the caller device 110 and notifies the incoming call sharing unit (backend) 502 of the incoming call request. The incoming call sharing unit (backend) 502 notifies the incoming call controller 503 of the incoming call request from the caller device 110.

The incoming call controller 503 determines, and notifies the incoming call sharing unit (backend) 502 of, which of the virtual machines VM1 to VMn is to process the incoming call request from the caller device 110. The incoming call sharing unit (backend) 502 delivers the incoming call request from the caller device 110, to the incoming call sharing unit (frontend) 504 of the virtual machine VM1 to VMn that received the notification from the incoming call controller 503.

The incoming call sharing unit (frontend) 504 of each of the virtual machines VM1 to VMn delivers to the processing unit 506, the incoming call request received from the incoming call sharing unit (backend) 502 of the virtual machine VM0. The processing unit 506 processes the incoming call request from the caller device 110.

A specific functional configuration of the communication terminal apparatus 400 for implementing the virtual machine VM0 will be described with reference to FIG. 6. In the following description, an arbitrary virtual machine among the virtual machines VM1 to VMn will be referred to as a "virtual machine VMi".

Figure 6:
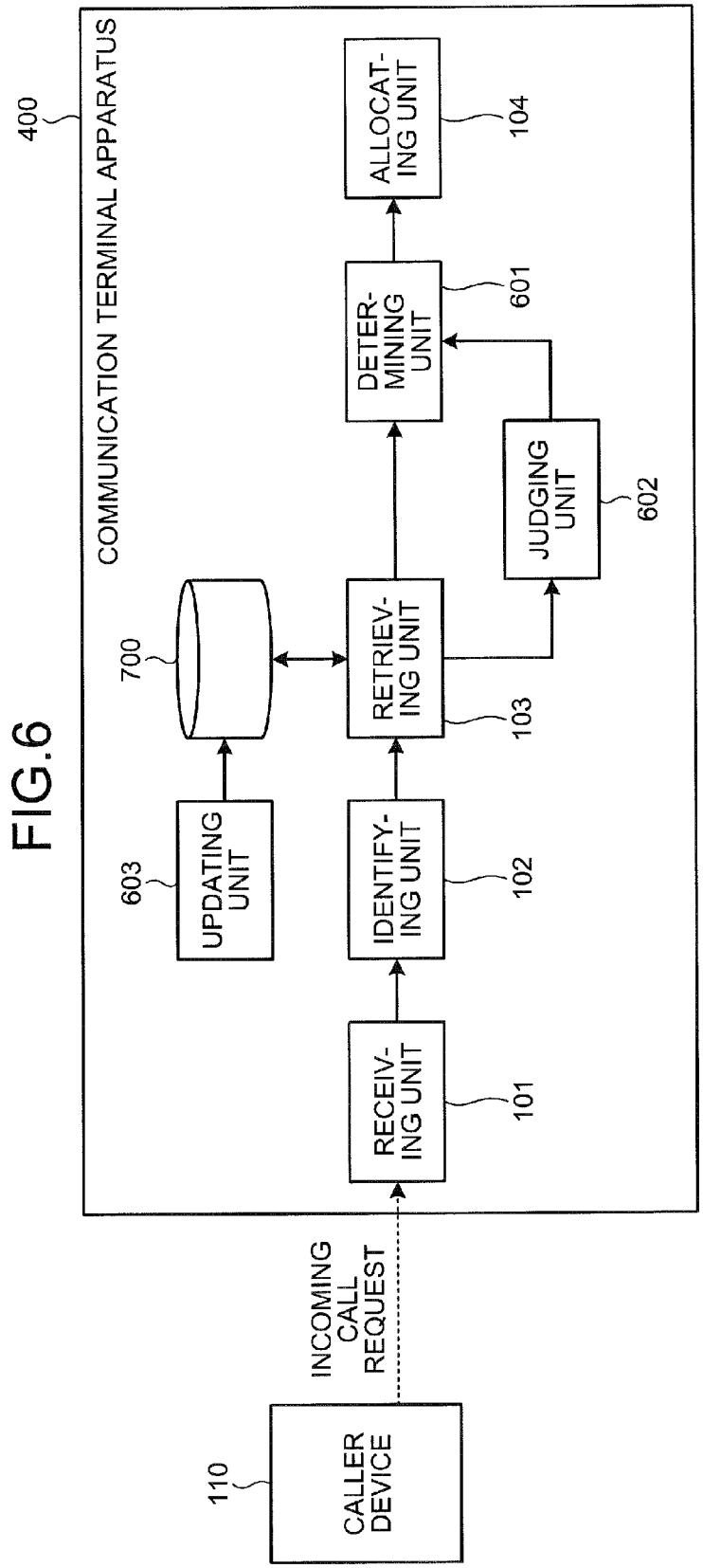
FIG. 6 is a block diagram of a functional configuration of the communication terminal apparatus according to the second embodiment.

FIG. 6 is a block diagram of a functional configuration of the communication terminal apparatus according to the second embodiment. In FIG. 6, the communication terminal apparatus 400 includes the receiving unit 101, the identifying unit 102, the retrieving unit 103, the allocating unit 104, a determining unit 601, a judging unit 602, and an updating unit 603. For example, the functions of the functional units (the receiving unit 101 to the allocating unit 104, the determining unit 601 to the updating unit 603) are implemented by executing on the CPU 401, programs stored in storage devices such as the ROM 402 and RAM 403 depicted in FIG. 4 or by the I/F 404.

The process results of the functional units (the receiving unit 101 to the allocating unit 104, the determining unit 601 to the updating unit 603) are stored to storage devices such as the RAM 403, for example. The receiving unit 101 corresponds to the incoming call function unit 501 of the virtual machine VM0 depicted in FIG. 5, for example. The allocating unit 104 corresponds to the incoming call sharing unit (backend) 502 depicted in FIG. 5, for example. The identifying unit 102, the retrieving unit 103, and the determining unit 601 to the updating unit 603 correspond to the incoming call controller 503 depicted in FIG. 5.

The receiving unit 101 receives an incoming call request from the caller device 110. For example, the receiving unit 101 receives an incoming call request from the caller device 110 via the network 407 (see FIG. 4).

The identifying unit 102 identifies the communication service Sj requested by the caller device 110, based on the received incoming call request. For example, the identifying unit 102 identifies the service ID of the communication service Sj requested by the caller device 110 included in the received incoming call request.

The retrieving unit 103 retrieves the OSi capable of processing the communication service Sj requested by the identified caller device 110 among the multiple OSs from OS1 to OSn running on its own terminal. Each of the OS1 to OSn is an OS running on each of the virtual machines VM1 to VMn operating in the communication terminal apparatus 400. Therefore, "retrieving the OSi capable of processing the communication service Sj among the OS1 to OSn" corresponds to "retrieving the virtual machine VMi capable of processing the communication service Sj, from among the virtual machines VM1 to VMn".

Therefore, in the following description, an object to be retrieved by the retrieving unit 103 is defined as "a virtual machine VMi capable of processing the communication service Sj". For example, the retrieving unit 103 refers to a virtual machine correlation table 700 depicted in FIG. 7 to retrieve a virtual machine VMi corresponding to the service ID of the communication service Sj requested by the caller device 110.

The virtual machine correlation table 700 is a table indicating the service Sj processable by the virtual machine VMi operating in the communication terminal apparatus 400. The virtual machine correlation table 700 is stored in a storage device such as the RAM 403 depicted in FIG. 4, for example. The contents of the virtual machine correlation table 700 will be described.

Figure 7:
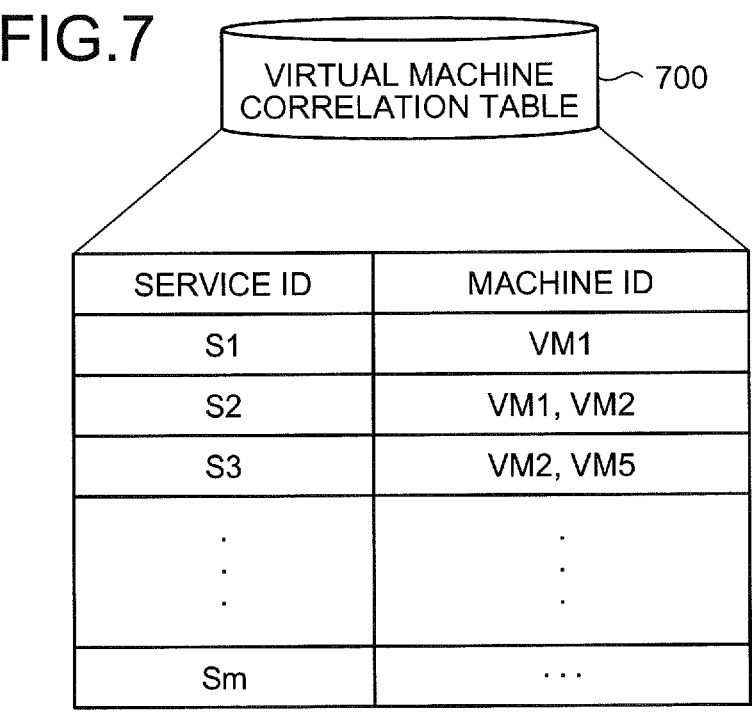
FIG. 7 is an explanatory view of an example of the contents of a virtual machine correlation table.

FIG. 7 is an explanatory view of an example of the contents of the virtual machine correlation table. In FIG. 7, the virtual machine correlation table 700 stores the machine IDs of the virtual machines VMi capable of processing the communication services Sj for each of the communication services Sj provided by the telecommunications carrier to users.

The service ID is an identifier of the communication service Sj provided by the telecommunications carrier to users. The machine ID is an identifier of the virtual machine VMi operating in the communication terminal apparatus 400. From the virtual machine correlation table 700, the service Sj processable by the virtual machine VMi operating in the communication terminal apparatus 400 can be identified.

Returning to the description of FIG. 6, if multiple communication services Sj requested by the caller device 110 are identified, the retrieving unit 103 retrieves from among the virtual machines VM1 to VMn, a virtual machine VMi capable of processing each of the communication services Sj. For example, it is assumed that the communication services S1 and S2 are identified as the communication services Sj requested by the caller device 110.

In this case, for example, the retrieving unit 103 refers to the virtual machine correlation table 700 to retrieve the machine ID "VM1" corresponding to the service ID "S1". The retrieving unit 103 then refers to the virtual machine correlation table 700 to retrieve the machine IDs "VM1, VM2" corresponding to the service ID "S2". As a result, the two virtual machines VM1 and VM2 are retrieved as the virtual machines VMi capable of processing the communication service S1 or S2 requested by the caller device 110.

In the following description, multiple virtual machines retrieved as the virtual machines capable of processing the communication service Sj requested by the caller device 110 will be referred to as "virtual machines VM[1] to VM[K]. An arbitrary virtual machine among the virtual machines VM[1] to VM[K] will be referred to as a "virtual machine VM[k]" (k=1, 2, . . . , K).

If two or more virtual machines VM[1] to VM[K] are retrieved, the determining unit 601 determines the virtual machine VMi for processing the incoming call request from the caller device 110, among the virtual machines VM[1] to VM[K]. For example, the determining unit 601 determines the virtual machine VMi for processing the incoming call request based on the number of the communication services Sj requested by the caller device 110 processable by each virtual machine VM[k].

For example, first, the determining unit 601 counts for each of the retrieved virtual machines VM[k], the number C[k] of the communication services Sj requested by the caller device 110 and processable by the virtual machine VM[k]. The determining unit 601 determines the virtual machine VMi for processing the incoming call request among the virtual machines VM[1] to VM[K] based on the number C[k] counted for each of the virtual machines VM[k].

In the example of a case where the communication services S1 and S2 are identified as described above, the virtual machines VM1 and VM2 are retrieved as the virtual machines VM[k] capable of processing the communication service S1 or S2. In this case, first, the determining unit 601 counts the numbers C1 and C2 of the communication services Sj requested by the caller device 110 and processable by the virtual machines VM1 and VM2.

In this case, since the virtual machine VM1 can process both the communication services S1 and S2 requested by the caller device 110, the number C1 for the virtual machine VM1 is "C1=2". On the other hand, since the virtual machine VM2 can process only the communication service S2 among the communication services S1 and S2 requested by the caller device 110, the number C2 for the virtual machine VM2 is "C2=1".

In this case, for example, the determining unit 601 determines the virtual machine VM1 having the largest number C1 (C1>C2) among the numbers C1 and C2 of the communication services Sj processable by the virtual machines VM1 and VM2 as the virtual machine VMi for processing the incoming call request from the caller device 110. However, if the number of the virtual machines VM[1] to VM[K] is three or more, the virtual machine VM[k] having the number C[k] at least larger than another virtual machine may be determined as the virtual machine VMi for processing the incoming call request from the caller device 110.

As a result, more communication services Sj requested from the caller device 110 can be provided to a user. If multiple virtual machines VM[k] among the virtual machines VM[1] to VM[K] have the largest number C[k], the virtual machine VMi for processing the incoming call request from the caller device 110 may be determined based on priority preliminarily given to each service Sj. For example, among the multiple virtual machines VM[k] having the largest number C[k], the virtual machine VM[k] capable of processing the higher-priority service Sj is determined as the virtual machine VMi for processing the incoming call request from the caller device 110.

The allocating unit 104 allocates the incoming call request from the caller device 110 to the determined virtual machine VMi. For example, the incoming call sharing unit (backend) 502 delivers the incoming call request from the caller device 110 to the incoming call sharing unit (frontend) 504 of the determined virtual machine VMi. As a result, the incoming call sharing unit (frontend) 504 of the virtual machine VMi receives and delivers to the processing unit 506, the incoming call request from the caller device 110. The processing unit 506 of the virtual machine VMi processes the incoming call request from the caller device 110.

The updating unit 603 updates a table indicating the communication service Sj processable by each OSi running on the terminal. For example, the incoming call controller 503 receives an update request from the managing unit 507 of the virtual machine VMi and updates the contents of the virtual machine correlation table 700. The update request from the managing unit 507 includes the service ID of the service Sj processable by the virtual machine VMi, for example.

For example, if a change is made in the service Sj processable by the virtual machine VMi, the managing unit 507 of the virtual machine VMi notifies the incoming call controller 503 of the service ID of the service Sj processable by the virtual machine VMi. As a result, the incoming call controller 503 updates the contents of the virtual machine correlation table 700 according to the service ID of the service Sj processable by the virtual machine VMi received from the managing unit 507.

A change is made in the service Sj processable by the virtual machine VMi when a new application is installed into the virtual machine VMi as well as when a new virtual machine VMi is added or when an existing virtual machine VMi is deleted.

If the multiple virtual machines VM[1] to VM[K] are retrieved, the retrieving unit 103 may determine the virtual machine VMi to process the incoming call request from the caller device 110 with consideration of the intention of a recipient (user of the communication terminal apparatus 400). If the virtual machine VMi processing the incoming call request from the caller device 110 cannot uniquely be determined from the virtual machines VM[1] to VM[K], the intension of the recipient may be considered.

Description will be made of determination techniques (1) to (6) for determining among the virtual machines VM[1] to VM[K], the virtual machine VMi to process the incoming call request from the caller device 110 with consideration of the intention of the recipient (user of the communication terminal apparatus 400).

<Determination Technique (1)>

The functions of the communication terminal apparatus 400 include a function of displaying the name, an image of the face, etc. of the user of the caller device 110 registered in a telephone book on the display 405, for example. If the name, an image of the face, etc. of the user of the caller device 110 are displayed on the display 405, the recipient can easily identify the caller device 110.

Therefore, in the determination technique (1), the virtual machine VM[k] capable of displaying the name and an image of the face of the user of the caller device 110 on the display 405 is determined as the virtual machine VMi processing the incoming call request from the caller device 110.

For example, first, the judging unit 602 judges whether an identifier of the caller device 110 included in the incoming call request is registered in a caller device list correlated with each of the virtual machines VM[k]. The identifier of the caller device 110 included in the incoming call request is the telephone number or the e-mail address of the caller device 110, for example.

The caller device list is information storing identifiers of certain caller devices. For example, the caller device list is a telephone book in which names, telephone numbers, e-mail addresses, face images, etc., of certain callers are registered. If an incoming call arrives from a caller device registered in the telephone book, the name, the face image, etc. of user of the caller device are displayed on the display 405 of the communication terminal apparatus 400.

In the following description, the telephone books correlated with the virtual machines VM1 to VMn will respectively be referred to as "telephone books TR1 to TRn" and the telephone books correlated with the virtual machines VM[1] to VM[K] will respectively be referred to as "telephone books TR[1] to TR[K]". The telephone books TR1 to TRn are correlated with the virtual machines VM1 to VMn and stored in the storage device such as the ROM 402 and the RAM 403, for example.

For example, the judging unit 602 identifies the telephone number of the caller device 110 included in the incoming call request. The judging unit 602 judges whether the identified telephone number of the caller device 110 is registered in the telephone book TR[k] correlated with the virtual machine VM[k].

For example, the incoming call controller 503 makes an inquiry to the referring unit 505 of the virtual machine VM[k] whether the telephone number of the caller device 110 is registered in the telephone book TR[k]. The referring unit 505 of the virtual machine VM[k] judges whether the telephone number of the caller device 110 is registered in the telephone book TR[k] and notifies the incoming call controller 503 of the judgment result. The contents of the telephone book TR1 will be described by taking the telephone book TR1 of the virtual machine VM1 as an example.

FIG. 8 is an explanatory view of an example of the contents of the telephone book. In FIG. 8, names, telephone numbers, e-mail addresses, and face images of certain callers are registered in the telephone book TR1. The face images may be the shot images of the certain callers or may be avatars imitating the certain callers.

For example, it is assumed that the telephone number of the caller device 110 is "090-xxxx-1234". In this case, since the identified telephone number "090-xxxx-1234" is registered as the telephone number of Taro Suzuki, the judging unit 602 judges that the telephone number of the caller device 110 is registered in the telephone book TR1 correlated with the virtual machine VM1.

The determining unit 601 determines the virtual machine VMi for processing the incoming call request from the caller device 110 based on the judged judgment result. For example, the determining unit 601 determines the virtual machine VM[k] having the telephone number of the caller device 110 registered in the telephone book TR[k] as the virtual machine VMi for processing the incoming call request from the caller device 110.

For example, it is assumed that the virtual machines VM[1] to VM[K] are virtual machines VM1 to VM3 and that the telephone number of the caller device 110 is registered only in the telephone books TR1 of the virtual machine VM1 among the virtual machines VM1 to VM3. In this case, the determining unit 601 determines the virtual machine VM1 as the virtual machine VMi for processing the incoming call request from the caller device 110.

As a result, the name, the face image, etc. of the caller device 110 are displayed on the display 405 at the time of the incoming call to improve convenience for the recipient, and the communication service Sj reflecting the intention of the caller device 110 can be provided to the user.

<Determination Technique (2)>

Multiple applications may exist as applications for providing the same communication service Sj. In such a case, from a viewpoint of providing high-quality of the communication service Sj, it is desirable to utilize an application with higher video coding performance when the video telephone, etc. are used, for example.

Therefore, the determining unit 601 determines the virtual machine VMi for processing the incoming call request from the caller device 110 based on the performance of applications running on the virtual machines VM[k]. The applications are software for providing the communication service Sj requested by the caller device 110. The applications include those for displaying images of the video telephone allowing users to talk while viewing each other's face, for example.

For example, the determining unit 601 refers to an application list 900 depicted in FIG. 9 to determine the virtual machine VMi for processing the incoming call request from the caller device 110. The application list 900 is stored in the storage device such as the ROM 402 and the RAM 403, for example. The contents of the application list 900 will be described.

FIG. 9 is an explanatory view of an example of the contents of the application list. In FIG. 9, the application list 900 has fields for machine ID, application ID, and performance. Information is entered into each of the fields to store records of the applications installed in the virtual machines VMi and the performance of the applications.

The machine ID is an identifier of the virtual machine VMi. The application ID is an identifier of an application. The performance is the performance of an application. The performance of an application includes the resolution of images displayed on the display 405, for example.

For example, it is assumed that the communication service Sj requested by the caller device 110 is "video telephone". It is also assumed that the virtual machines VM[1] to VM[K] are virtual machines VM1 and VM2 and that the applications running for providing the video telephone are "applications A1 and A2".

In this case, the determining unit 601 refers to the application list 900 to identify the performance of the applications A1 and A2 running on the virtual machines VM1 and VM2 for providing the video telephone. In this example, the resolution "240×240 (pixels)" is identified as the performance of the application A1 and the resolution "320×320 (pixels)" is identified as the performance of the application A2.

The determining unit 601 identifies the application A2 having the highest resolution. Among the virtual machines VM1 and VM2, the determining unit 601 determines the virtual machine VM2 on which the identified application A2 installed, as the virtual machine VMi for processing the incoming call request from the caller device 110.

As a result, the incoming call request from the caller device 110 can be processed by using a high-performance application and the communication service Sj can be provided with high-quality to the recipient.

The contents of the application list 900 are updated according to an update request from the managing unit 507 of the virtual machine VMi, for example, when a new application is installed onto the virtual machine VMi. The update request includes the application ID of the newly installed application and the information about performance of the application, for example.

<Determination Technique (3)>

In some utilization forms of the communication terminal apparatus 400, the OSi used at the time of an incoming call may selectively be used according to time. For example, a work OS may be used during a work time slot from 9:00 to 17:00 and a private OS may be used from 17:01 to 8:59.

Therefore, based on the time of receipt of an incoming call request from the caller device 110, the determining unit 601 determines from among the virtual machines VM[1] to VM[K], the virtual machine VMi for processing the incoming call request. The time of receipt of the incoming call request can be identified by a function of the communication terminal apparatus 400 for measuring the time, for example.

For example, the determining unit 601 refers to a time slot list 1000 depicted in FIG. 10 to determine the virtual machine VMi for processing the incoming call request from the caller device 110. The time slot list 1000 is stored in the storage device such as the ROM 402 and the RAM 403, for example. The contents of the time slot list 1000 will be described.

FIG. 10 is an explanatory view of an example of the contents of the time slot list. In FIG. 10, the time slot list 1000 stores in a correlated manner, an OS name of the OSi used at the time of an incoming call and a machine ID of the virtual machine VMi running the OSi for each of time slots T1 and T2.

For example, it is assumed that the virtual machines VM[1] to VM[K] are the virtual machines VM1 and VM2. When the time of receipt of an incoming call request from the caller device 110 corresponds to the time slot T1, the determining unit 601 refers to the time slot list 1000 and determines the virtual machine VM1 as the virtual machine VMi for processing the incoming call request. On the other hand, when the time of receipt of an incoming call request from the caller device 110 corresponds to the time slot T2, the determining unit 601 determines the virtual machine VM2 as the virtual machine VMi for processing the incoming call request.

As a result, the OSi used at the time of an incoming call can be selectively used according to the time. For example, OSs can be used selectively in a manner such that the work OS is used during a work time slot and that the private OS is used during other time slots.

Although at least one virtual machine VM[k] among the virtual machines VM[1] to VM[K] is assumed to be registered in the time slot list 1000 in the description, no virtual machine VM[k] is registered in some cases. In such a case, the determining unit 601 may determine an arbitrary virtual machine VM[k] among the virtual machines VM[1] to VM[K] as the virtual machine VMi for processing the incoming call request from the caller device 110.

<Determination Technique (4)>

In some utilization forms of the communication terminal apparatus 400, the OSi used at the time of an incoming call may be used selectively according to location. For example, the work OS may be used in a metropolitan area and the private OS may be used in other locations.

Therefore, the determining unit 601 determines among the virtual machines VM[1] to VM[K], the virtual machine VMi for processing the incoming call request from the caller device 110, based on the current position of the terminal. The current position of the terminal in which the determining unit 601 is implemented is positional information such as latitude and longitude indicative of the current position of the terminal, for example. The current position of the terminal can be acquired from the global positioning system (GPS) mounted on the communication terminal apparatus 400, for example.

Figure 11:
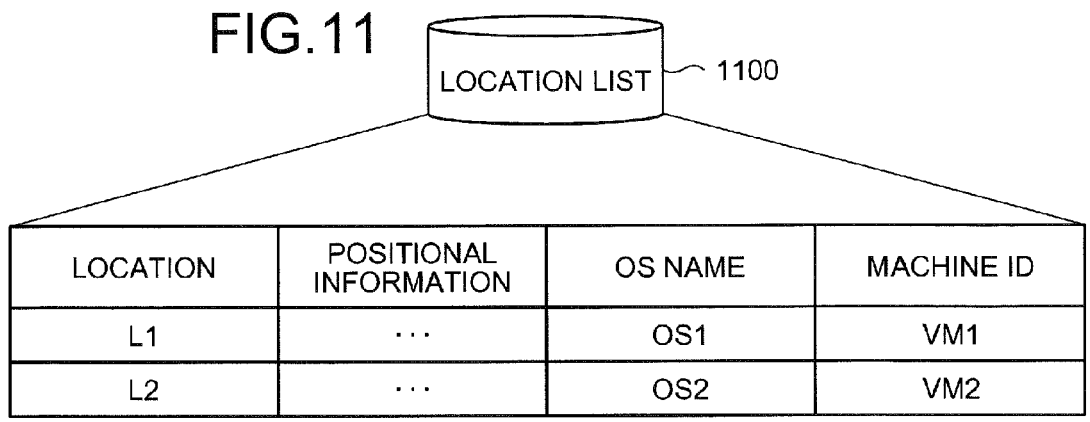
FIG. 11 is an explanatory view of an example of the contents of a location list.

For example, the determining unit 601 refers to a location list 1100 depicted in FIG. 11 to determine the virtual machine VMi for processing the incoming call request from the caller device 110. The location list 1100 is stored in a storage device such as the ROM 402 and the RAM 403, for example. The contents of the location list 1100 will be described.

FIG. 11 is an explanatory view of an example of the contents of the location list. In FIG. 11, the location list 1100 stores in a correlated manner, positional information of locations L1 and L2, an OS name of the OSi used at the time of an incoming call, and a machine ID of the virtual machine VMi running the OSi for each of the locations L1 and L2. The positional information of the locations L1 and L2 is for identifying a range of the locations L1 and L2 by latitude and longitude, for example.

For example, it is assumed that the virtual machines VM[1] to VM[K] are the virtual machines VM1 and VM2. First, the determining unit 601 refers to the location list 1100 to identify the location L1 or L2 corresponding to the current position of the terminal. If the current position of the terminal is at the location L1, the determining unit 601 refers to the location list 1100 and determines the virtual machine VM1 as the virtual machine VMi for processing the incoming call request. On the other hand, if the current position of the terminal is at the location L2, the determining unit 601 refers to the location list 1100 and determines the virtual machine VM2 as the virtual machine VMi for processing the incoming call request.

As a result, the OSi used at the time of an incoming call can be used selectively according to the current position of the terminal. For example, OSs can be used selectively in a manner such that the work OS is used in a metropolitan area and the private OS is used in locations other than the metropolitan area.

<Determination Technique (5)>

In some utilization forms of the communication terminal apparatus 400, peripheral devices connected to the communication terminal apparatus 400 are used for a telephone call. For example, a recipient may use a headset for a telephone call. The headset is a headphone integrated with a microphone enabling the user to talk on the phone without holding the terminal body.

Thus, the determining unit 601 determines the virtual machine VMi for processing the incoming call request from the caller device 110, based on a connection status of peripheral devices connected to the virtual machines VM[k]. For example, the incoming call controller 503 makes an inquiry to the referring unit 505 of the virtual machine VM[k] about the connection status of a headset.

The referring unit 505 of the virtual machine VM[k] judges whether a headset is connected and notifies the incoming call controller 503 of the judgment result. Based on the judgment results from the referring units 505 of the virtual machines VM[k], the incoming call controller 503 determines the virtual machine VM[k] with the headset connected as the virtual machine VMi for processing the incoming call request from the caller device 110.

As a result, peripheral devices such as a headset can be used at the time of an incoming call and convenience for the recipient can be improved.

<Determination Technique (6)>

In some techniques of determining the OSi for processing the incoming call from the caller device 110, a recipient selects an arbitrary OSi at the time of an incoming call. By accumulating the operation history of the OSi selected by the recipient at the time of an incoming call and setting the OS more frequently selected by a recipient as the OSi for processing the incoming call request, the intention of the recipient can be reflected.

Therefore, based on the operation history when the recipient selects the OSi processing an incoming call request from the caller device 110 at the time of an incoming call, the determining unit 601 determines from among the virtual machines VM[1] to VM[K], the virtual machine VMi to process an incoming call request from the caller device 110. For example, the determining unit 601 refers to an operation history table 1200 depicted in FIG. 12 to determine the virtual machine VMi to process the incoming call request from the caller device 110.

The operation history table 1200 is stored in a storage device such as the RAM 403, for example. The contents of the operation history table 1200 will be described. In this description, "OS1 to OS5" are taken as an example of multiple OSs from OS1 to OSn running on the communication terminal apparatus 400.

FIG. 12 is an explanatory view of an example of the contents of the operation history table. In FIG. 12, for each of services S1 to Sm, the operation history table 1200 stores the number of times of selection of each of the OS1 to OS5 for processing the incoming call request from the caller device 110 as a result of input using the input device 406 by the recipient.

For example, it is assumed that the communication service Sj requested by the caller device 110 is a communication service S7 and that the virtual machines VM[1] to VM[K] are the virtual machines VM1 to VM5. In this case, the determining unit 601 refers to the operation history table 1200 to identify the number of times that each of the OS1 to OS5 has been selected to process an incoming call request from the caller device 110 for the communication service S7.

The determining unit 601 identifies the OS4 having the largest number of times among the OS1 to OS5. The determining unit 601 determines the virtual machine VM4 running the OS4 as the virtual machine VMi to process the incoming call request from the caller device 110. As a result, the communication service Sj can be provided reflecting the intention of the recipient.

Which of the determination techniques (1) to (6) described above is used as the technique for determining the virtual machine VMi processing the incoming call request from the caller device 110 can arbitrarily be set. Multiple determination techniques among the determination techniques (1) to (6) described above may be used in a combined manner.

If multiple virtual machines VM[k] exist as a result of using the determination techniques (1) to (6) described above, an arbitrary virtual machine among the multiple virtual machines VM[k] may be determined as the virtual machine VMi to process the incoming call request from the caller device 110.

If no virtual machine VMi capable of processing the communication service Sj requested by the caller device 110 is retrieved by the retrieving unit 103, the determination techniques (1) to (6) described above may be used for determining the virtual machine VMi to process the incoming call request from the caller device 110. Similarly, if the communication service Sj requested by the caller device 110 cannot be identified, the determination techniques (1) to (6) described above may be used.

If no virtual machine VMi capable of processing the communication service Sj requested by the caller device 110 is retrieved, a virtual machine VMx set in advance for a normal incoming call may be determined as the virtual machine VMi to process the incoming call request from the caller device 110. Similarly, if the communication service Sj requested by the caller device 110 cannot be identified, the virtual machine VMx set in advance for a normal incoming call may be used. The virtual machine VMx for a normal incoming call is the virtual machine VMi implementing a minimum function required for a telephone call, for example.

Figure 13:
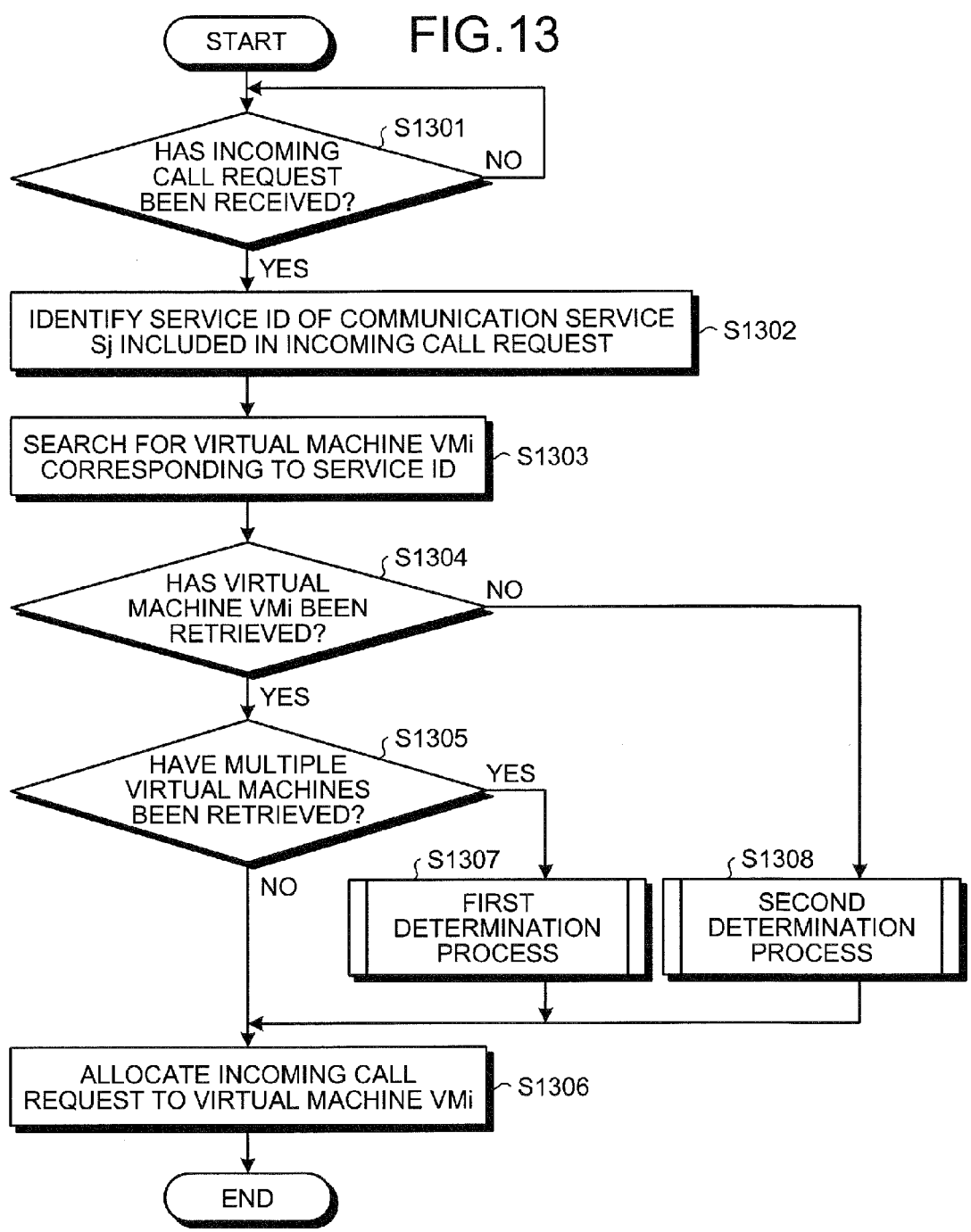
FIG. 13 is a flowchart of an example of an incoming call process procedure of the communication terminal apparatus according to the second embodiment.

FIG. 13 is a flowchart of an example of an incoming call process procedure of the communication terminal apparatus according to the second embodiment. In the flowchart of FIG. 13, the communication terminal apparatus determines whether the receiving unit 101 has received an incoming call request from the caller device 110 (step S1301).

The communication terminal apparatus waits until the receiving unit 101 receives an incoming call request from the caller device 110 (step S1301: NO). When the receiving unit 101 receives an incoming call request (step S1301: YES), the identifying unit 102 identifies the service ID of the communication service Sj requested by the caller device 110 and included in the received incoming call request (step S1302).

The retrieving unit 103 refers to the virtual machine correlation table 700 and searches for a virtual machine VMi corresponding to the service ID of the communication service Sj requested by the caller device 110 (step S1303). If the virtual machine VMi is retrieved (step S1304: YES), the determining unit 601 determines whether multiple virtual machines VM[1] to VM[K] have been retrieved (step S1305).

If multiple virtual machines have not been retrieved (step S1305: NO), the allocating unit 104 allocates the incoming call request from the caller device 110 to the retrieved virtual machine VMi (step S1306) and a series of the processes of this flowchart is terminated.

On the other hand, if multiple virtual machines have been retrieved (step S1305: YES), the determining unit 601 executes a first determination process of determining the virtual machine VMi for processing the incoming call request from the caller 100 (step S1307). The allocating unit 104 allocates the incoming call request from the caller device 110 to the determined virtual machine VMi (step S1306) and a series of the processes of this flowchart is terminated.

If the virtual machine VMi is not retrieved at step S1304 (step S1304: NO), the determining unit 601 executes a second determination process of determining the virtual machine VMi for processing the incoming call request from the caller 100 (step S1308). The allocating unit 104 allocates the incoming call request from the caller device 110 to the determined virtual machine VMi (step S1306) and a series of the processes of this flowchart is terminated.

As a result, the incoming call request from the caller 100 can be processed properly and the communication service Sj can be provided to the user, reflecting the intention of the caller 100.

<First Determination Process Procedure>

A process procedure of the first determination process at step S1307 depicted in FIG. 13 will be described. For example, the determination techniques (1) and (5) described above are used for determining among the virtual machines VM[1] to VM[K], the virtual machine VMi to process the incoming call request from the caller device 110 in this description.

Figure 14:
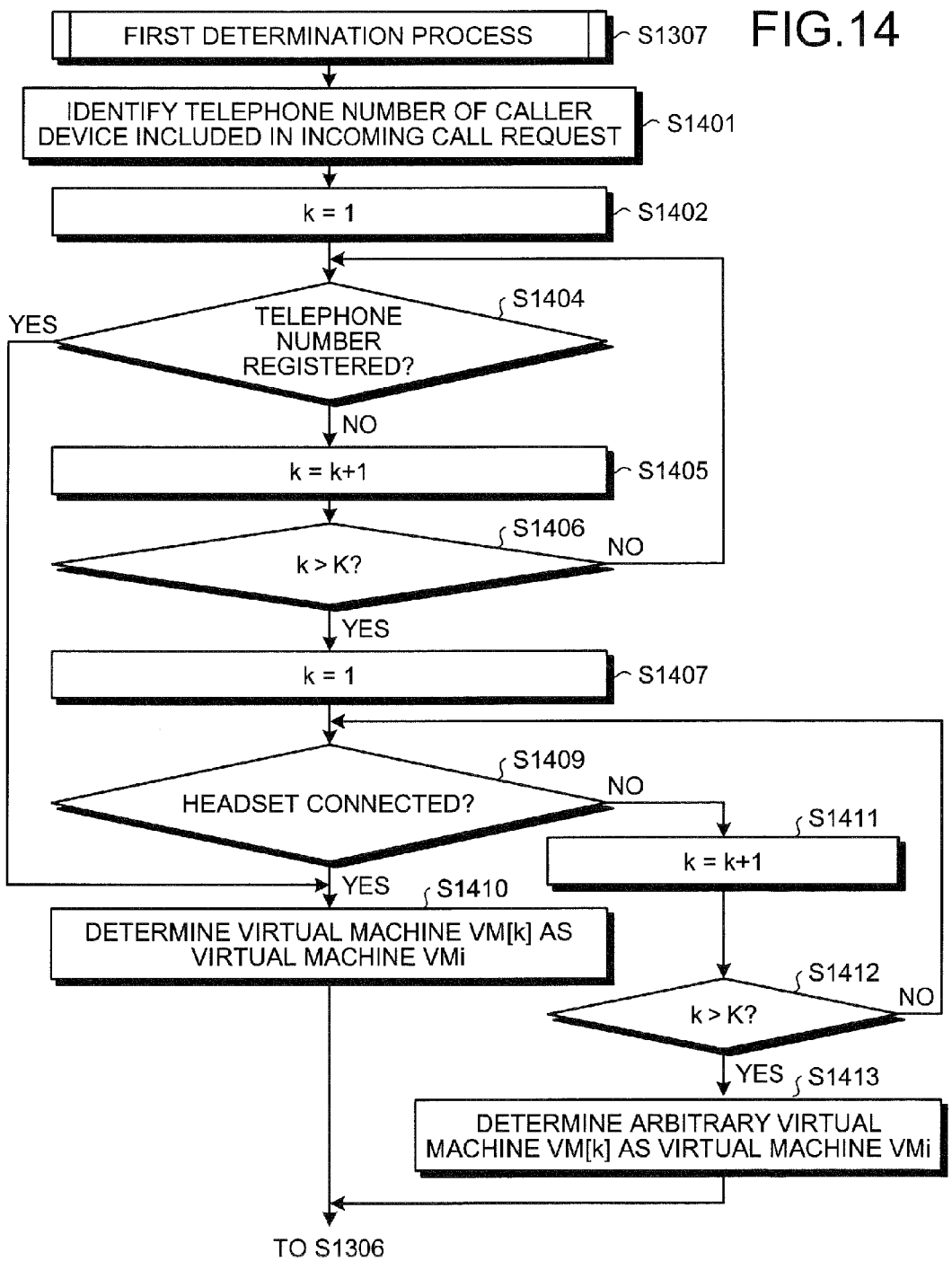
FIG. 14 is a flowchart of an example of a process procedure of a first determination process.

FIG. 14 is a flowchart of an example of a process procedure of the first determination process. In the flowchart of FIG. 14, the judging unit 602 identifies the telephone number of the caller device 110 included in the incoming call request received at step S1301 depicted in FIG. 13 (step S1401).

The judging unit 602 initializes "k" of the virtual machine VM[k] included among the virtual machines VM[1] to VM[K] to "k=1" (step S1402). The judging unit 602 judges whether the identified telephone number of the caller device 110 is registered in the telephone book TR[k] correlated with the virtual machine VM[k] (step S1404).

If the telephone number of the caller device 110 is registered (step S1404: YES), the procedure goes to step S1410. On the other hand, if the telephone number of the caller device 110 is not registered (step S1404: NO), the judging unit 602 increments "k" of the virtual machine VM[k] (step S1405) and determines whether "k" is larger than "K" (step S1406).

If "k" is equal to or less than "K" (step S1406: NO), the procedure returns to step S1403. On the other hand, if "k" is larger than "K" (step S1406: YES), "k" of the virtual machine VM[k] is initialized to "k=1" (step S1407). The determining unit 601 determines whether a headset is connected to the virtual machine VM[k] (step S1409).

If a headset is connected (step S1409: YES), the determining unit 601 determines the virtual machine VM[k] as the virtual machine VMi for processing the incoming call request from the caller device 110 (step S1410) and the procedure goes to step S1306 depicted in FIG. 13.

On the other hand, if a headset is not connected (step S1409: NO), the determining unit 601 increments "k" of the virtual machine VM[k] (step S1411) and determines whether "k" is larger than "K" (step S1412). If "k" is equal to or less than "K" (step S1412: NO), the procedure returns to step S1408.

On the other hand, if "k" is larger than "K" (step S1412: YES), the determining unit 601 determines an arbitrary virtual machine VM[k] among the virtual machines VM[1] to VM[K] as the virtual machine VMi for processing the incoming call request from the caller device 110 (step S1413) and the procedure goes to step S1306 depicted in FIG. 13.

As a result, the intention of not only the caller 100 but also of the recipient can be reflected to provide to the user, the communication service Sj reflecting the intention of the caller 100 and to improve the convenience of the recipient.

Although when it is determined that the telephone number is registered at step S1404, the virtual machine VM[k] is determined as the virtual machine VMi for processing the incoming call request from the caller device 110 in the description, configuration is not limited hereto. For example, all the virtual machines VM[1] to VM[K] may be narrowed down by determining the presence of registration of the telephone numbers and then further be narrowed down based on the headset connection status.

<Second Determination Process Procedure>

A process procedure of the second determination process at step S1308 depicted in FIG. 13 will be described. For example, the determination technique (1) is used for determining from among the virtual machines VM1 to VMn, the virtual machine VMi for processing the incoming call request from the caller device 110 in this description.

Figure 15:
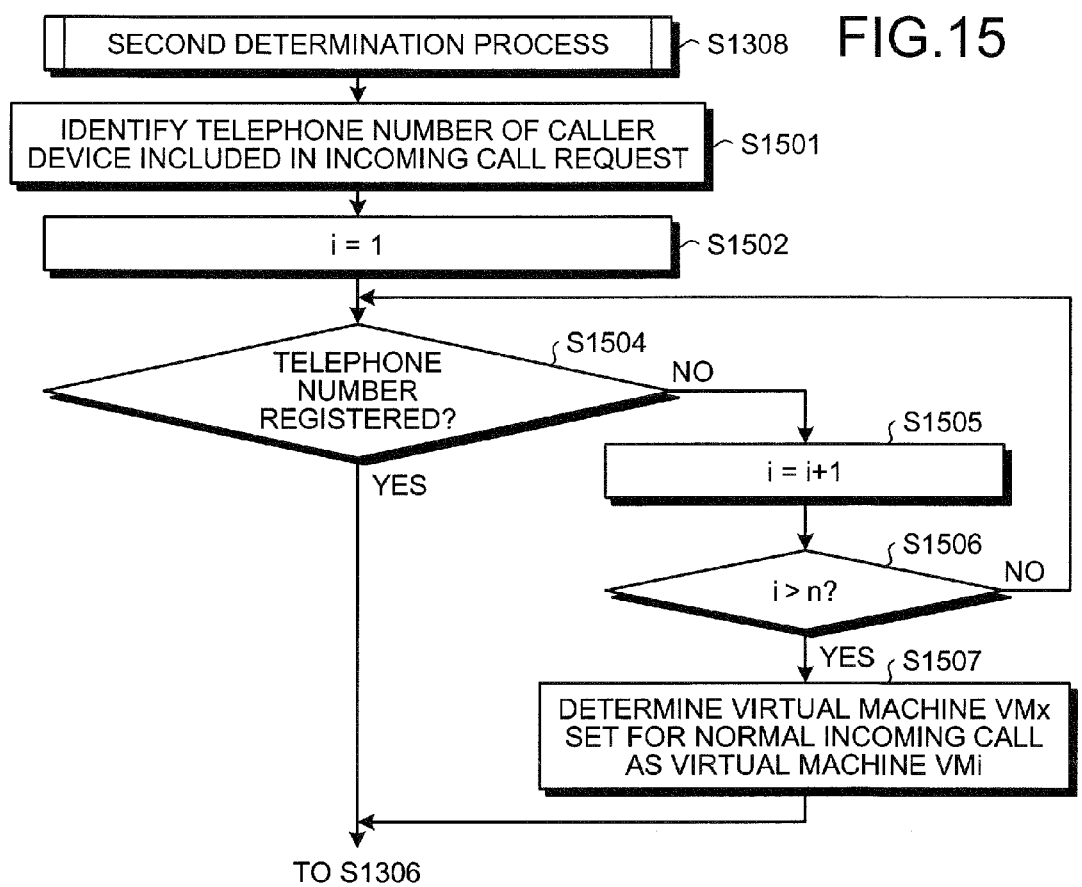
FIG. 15 is a flowchart of an example of a process procedure of a second determination process.

FIG. 15 is a flowchart of an example of a process procedure of the second determination process. In the flowchart of FIG. 15, the judging unit 602 identifies the telephone number of the caller device 110 included in the incoming call request received at step S1301 depicted in FIG. 13 (step S1501).

The judging unit 602 initializes "i" of the virtual machine VMi included among the virtual machines VM1 to VMn to "i=1" (step S1502). The judging unit 602 judges whether the identified telephone number of the caller device 110 is registered in the telephone book TRi correlated with the virtual machine VMi (step S1504).

If the telephone number of the caller device 110 is registered (step S1504: YES), the procedure goes to step S1306 depicted in FIG. 13. On the other hand, if the telephone number of the caller device 110 is not registered (step S1504: NO), the judging unit 602 increments "i" of the virtual machine VMi (step S1505) and determines whether "i" is larger than "n" (step S1506).

If "i" is equal to or less than "n" (step S1506: NO), the procedure returns to step S1503. On the other hand, if "i" is larger than "n" (step S1506: YES), the determining unit 601 determines the virtual machine VMx set in advance for a normal incoming call as the virtual machine VMi for processing the incoming call request from the caller device 110 among the virtual machines VM1 to VMn (step S1507) and the procedure goes to step S1306 depicted in FIG. 13.

As a result, if no virtual machine VMi capable of processing the communication service Sj requested by the caller device 110 is retrieved, the OSi capable of displaying the name, the face image, etc. of the caller device 110 at the time of an incoming call can be used preferentially and the convenience of the recipient can be improved.

The communication terminal apparatus 400 according to the second embodiment described above can retrieve the virtual machine VMi capable of processing the communication service Sj requested by the caller device 110, from among the virtual machines VM1 to VMn operating on the terminal and can allocate the incoming call request from the caller 100 thereto. As a result, the incoming call request from the caller 100 can be processed properly and the communication service Sj can be provided to the user, reflecting the intention of the caller 100.

If multiple communication services Sj requested by the caller device 110 exist, the communication terminal apparatus 400 can determine the virtual machine VMi for processing the incoming call request from the caller device 110, based on the number Ci of the communication services Sj processable by each of the virtual machines VMi. As a result, more communication services Sj requested from the caller device 110 can be provided to the user.

The communication terminal apparatus 400 can determine from among the virtual machines VM[1] to VM[K], the virtual machine VM[k] having the telephone number of the caller device 110 registered in the telephone book TR[k] as the virtual machine VMi for processing the incoming call request from the caller device 110. Therefore, the name, the face image, etc. of the user of the caller device 110 can be displayed on the display 405 at the time of an incoming call. As a result, the communication service Sj can be provided to the user, reflecting the intention of the caller 100 and the convenience of the recipient can be improved.

The communication terminal apparatus 400 can determine the virtual machine VMi for processing the incoming call request from the caller device 110, based on the performance of the applications running on the virtual machines VM[k]. As a result, the incoming call request from the caller device 110 can be processed by using a high-performance application and the communication service Sj can be provided to the recipient with high-quality.

Based on the time of receipt of an incoming call request from the caller device 110, the communication terminal apparatus 400 can determine among the virtual machines VM[1] to VM[K], the virtual machine VMi for processing the incoming call request. As a result, the OSi used at the time of an incoming call can be used selectively according to the time. For example, OSs can selectively be used in a manner such that the work OS is used during a work time slot and that the private OS is used during other time slots.

The communication terminal apparatus 400 can determine from among the virtual machines VM[1] to VM[K], the virtual machine VMi for processing the incoming call request from the caller device 110, based on the current position of the terminal. As a result, the OSi used at the time of an incoming call can be used selectively according to the current position of the terminal. For example, OSs can be used selectively in a manner such that the work OS is used in a metropolitan area and the private OS is used in locations other than a metropolitan area.

The communication terminal apparatus 400 can determine the virtual machine VMi for processing the incoming call request from the caller device 110, based on a connection status of peripheral devices connected to the virtual machines VM[k]. As a result, a peripheral device such as a headset can be used at the time of an incoming call to improve the convenience of the recipient.

The communication terminal apparatus 400 can determine the virtual machine VMi for processing the incoming call request from the caller device 110 based on the operation history when the recipient selects the OSi processing the incoming call request from the caller device 110 at the time of an incoming call. As a result, the communication service Sj reflecting the intention of the recipient can be provided and a processing load of determining the virtual machine VMi for processing the incoming call request from the caller device 110 can be reduced.

One example of a communication terminal apparatus 1600 according to a third embodiment will be described. In the third embodiment, description will be made of a case where the virtual machine VM1 includes the functional units (the incoming call function unit 501 to the incoming call controller 503) of the virtual machine VM0 described in the second embodiment. Components identical to those described in the first and second embodiments are denoted by the same reference numerals used in the first and the second embodiments and will not be described.

Figure 16:
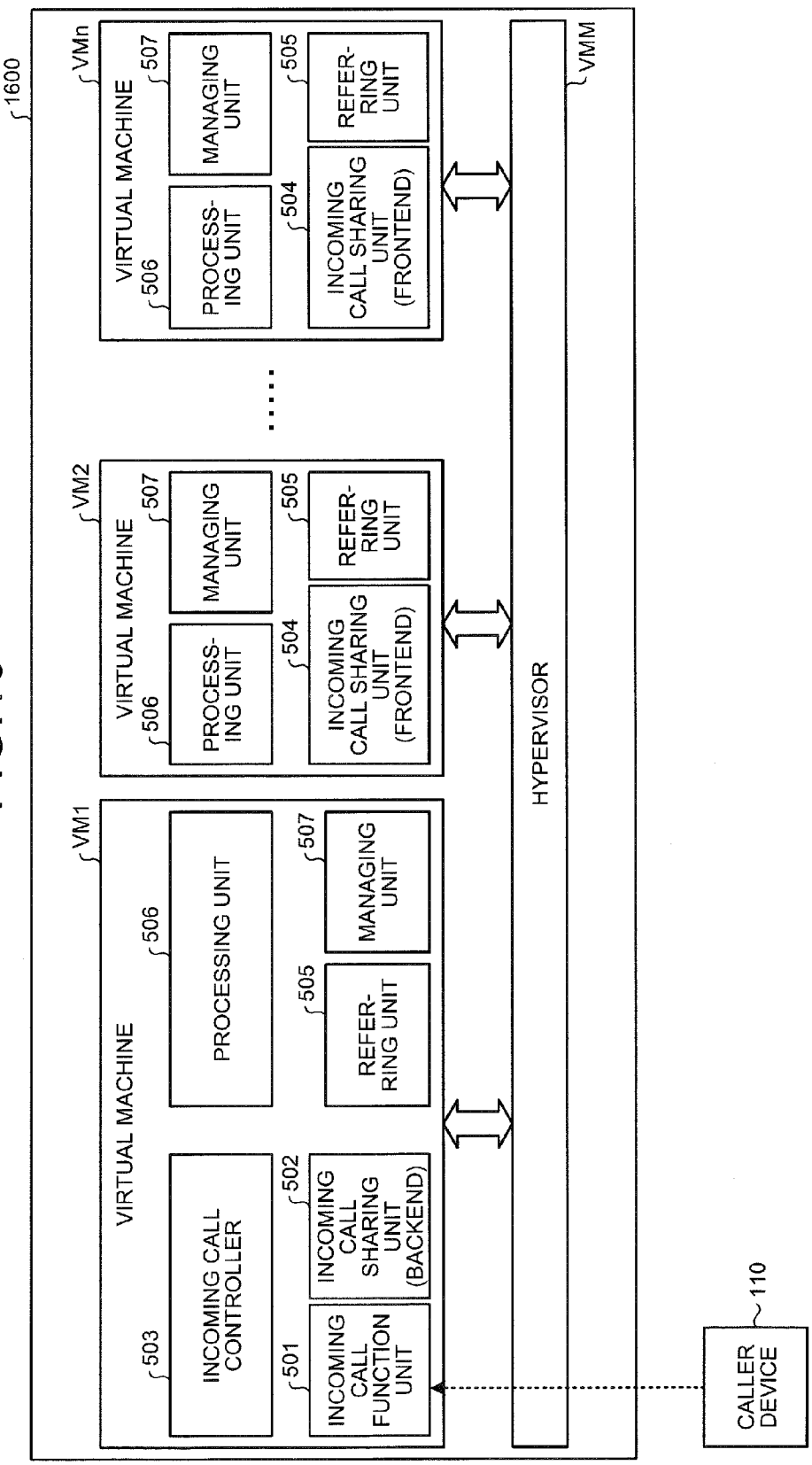
FIG. 16 is an explanatory view of one example of the communication terminal apparatus according to a third embodiment.

FIG. 16 is an explanatory view of one example of the communication terminal apparatus according to the third embodiment. In FIG. 16, the communication terminal apparatus 1600 includes virtual machines VM1 to VMn and a hypervisor VMM.

The virtual machine VM1 includes the incoming call function unit 501, the incoming call sharing unit (backend) 502, the incoming call controller 503, the referring unit 505, the processing unit 506, and the managing unit 507. Each of the virtual machines VM2 to VMn includes the incoming call sharing unit (frontend) 504, the referring unit 505, the processing unit 506, and the managing unit 507. The incoming call sharing unit (frontend) 504 is a function for sharing the incoming call function unit 501 included in the virtual machine VM1 among the multiple OSs from OS1 to OSn. Therefore, in the communication terminal apparatus 1600, the incoming call function unit 501 of the virtual machine VM1 is shared among the different OSs from OS1 to OSn.

An example of a process procedure of the communication terminal apparatus 1600 at the time of an incoming call will be described. In the communication terminal apparatus 1600, the incoming call function unit 501 receives an incoming call request from the caller device 110 and notifies the incoming call sharing unit (backend) 502 of the incoming call request. The incoming call sharing unit (backend) 502 notifies the incoming call controller 503 of the incoming call request from the caller device 110.

The incoming call controller 503 determines, and notifies the incoming call sharing unit (backend) 502 of, which of the virtual machines VM1 to VMn is to process the incoming call request from the caller device 110. If the virtual machine VM1 is to process the incoming call request, the incoming call sharing unit (backend) 502 delivers to the processing unit 506, the incoming call request from the caller 100. The processing unit 506 processes the incoming call request from the caller device 110.

On the other hand, if a virtual machine other than the virtual machine VM1 is to process the incoming call request, the incoming call sharing unit (backend) 502 delivers the incoming call request from the caller device 110, to the incoming call sharing unit (frontend) 504 of the virtual machine VM2 to VMn that received the notification from the incoming call controller 503. The incoming call sharing unit (frontend) 504 of each of the virtual machines VM2 to VMn delivers to the processing unit 506, the incoming call request delivered from the incoming call sharing unit (backend) 502. The processing unit 506 processes the incoming call request from the caller device 110.

The communication terminal apparatus 1600 according to the third embodiment described above eliminates the necessity for communication between the virtual machines via the hypervisor VMM when the virtual machine VM1 processes the incoming call request from the caller device 110. Therefore, the performance of the communication terminal apparatus 1600 at the time of an incoming call can be improved. Particularly, by including the functional units (the incoming call function unit 501 to the incoming call controller 503) of the virtual machine VM0 described in the second embodiment into the frequently used virtual machine VMi, the communication between the virtual machines can significantly be reduced.

The incoming call processing method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A communication terminal apparatus comprising a computer configured to:
   receive an incoming call request from a caller device;
   identify at least one communication service requested by the caller device, based on the received incoming call request;
   retrieve from among a plurality of OSs running on the communication terminal apparatus and based on communication services processable by each OS included among the OSs using an OS correlation table storing, for each OS included among the OSs, a service ID of each communication service processable by the OS, at least one OS capable of processing the identified at least one communication service;
   allocate the incoming call request to the retrieved at least one OS; and
   determine an OS for processing the incoming call request, wherein
     the computer retrieves at least one OS capable of processing each identified communication service when multiple communication services are identified,
     the computer counts the numbers of the communication services requested by the caller device and processable by the OSs, and
     the computer determines an OS for processing the incoming call request, from among retrieved OSs when two or more OSs have been retrieved and based on the number of the identified communication services processable by each retrieved OS.

2. The communication terminal apparatus according to claim 1, wherein
   each OS among the OSs is correlated with a caller device list that is specific to each of the OSs and stores identifiers for identifying given caller devices,
   the computer is further configured to judge whether an identifier of a caller device included in the incoming call request is registered in the caller device list correlated with a retrieved OS, when two or more OSs have been retrieved, and the computer determines an OS for processing the incoming call request, from among the retrieved OSs and based on a judgment result.

3. The communication terminal apparatus according to claim 1, wherein
   the computer determines an OS for processing the incoming call request, from among the retrieved OSs and based on performance of an application for providing the identified communication service and running on the retrieved OSs.

4. The communication terminal apparatus according to claim 1, wherein
   the computer determines an OS for processing the incoming call request, from among the retrieved OSs and based on the time when the incoming call request is received.

5. The communication terminal apparatus according to claim 1, wherein
   the computer determines an OS for processing the incoming call request, from among the retrieved OSs and based on a current position of the communication terminal apparatus.

6. The communication terminal apparatus according to claim 1, wherein
   the computer determines an OS for processing the incoming call request, from among the retrieved OSs and based on a connection status of a peripheral device with respect to the retrieved OSs.

7. The communication terminal apparatus according to claim 1, wherein
   the computer determines an OS for processing the incoming call request, from among the retrieved OSs and based on an operation history of user OS selections made at the time of an incoming call for processing the incoming call request.

8. The communication terminal apparatus according to claim 1, wherein the communication service is selected from the group consisting of a service enabling one to make a phone call while viewing the face of the other person, a service enabling a phone call among three or more persons, and a service of displaying a message such as characters and pictograms on an incoming call screen of the other party at the same time as the incoming call.

9. A non-transitory computer-readable recording medium storing an incoming call processing program that causes a computer to execute a process comprising:
   receiving an incoming call request from a caller device;
   identifying at least one communication service requested by the caller device, based on the received incoming call request;
   retrieving from among a plurality of OSs running on the communication terminal apparatus and based on communication services processable by each OS included among the OSs using an OS correlation table storing, for each OS included among the OSs, a service ID of each communication service processable by the OS, at least one OS capable of processing the identified at least one communication service;
   allocating the incoming call request to the retrieved at least one OS; and
   determining an OS for processing the incoming call request, wherein
     the computer retrieves at least one OS capable of processing each identified communication service when multiple communication services are identified,
     the computer counts the numbers of the communication services requested by the caller device and processable by the OSs, and the computer determines an OS for processing the incoming call request, from among retrieved OSs when two or more OSs have been retrieved and based on the number of the identified communication services processable by each retrieved OS.

10. An incoming call processing method executed by a computer of a communication terminal apparatus, the incoming call processing method comprising:

receiving an incoming call request from a caller device;

identifying at least one communication service requested by the caller device, based on the received incoming call request;

retrieving from among a plurality of OSs running on the communication terminal apparatus and based on communication services processable by each OS included among the OSs using an OS correlation table storing, for each OS included among the OSs, a service ID of each communication service processable by the OS, at least one OS capable of processing the identified communication service;

allocating the incoming call request to the at least one retrieved OS; and determining an OS for processing the incoming call request, wherein the computer retrieves at least one OS capable of processing each identified communication service when multiple communication services are identified, the computer counts the numbers of the communication services requested by the caller device and processable by the OSs, and the computer determines an OS for processing the incoming call request, from among retrieved OSs when two or more OSs have been retrieved and based on the number of the identified communication services processable by each retrieved OS.

* * * * *